United States Patent
Ryoshi et al.

(10) Patent No.: US 11,862,793 B2
(45) Date of Patent: Jan. 2, 2024

(54) POSITIVE ELECTRODE ACTIVE MATERIAL FOR NON-AQUEOUS ELECTROLYTE SECONDARY BATTERY AND METHOD FOR PRODUCING THE SAME, AND NON-AQUEOUS ELECTROLYTE SECONDARY BATTERY AND METHOD FOR PRODUCING THE SAME

(71) Applicant: SUMITOMO METAL MINING CO., LTD., Tokyo (JP)

(72) Inventors: Kazuomi Ryoshi, Niihama (JP); Motoaki Saruwatari, Niihama (JP); Hiroko Oshita, Niihama (JP); Yoshihiro Otsuka, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 336 days.

(21) Appl. No.: 16/641,864

(22) PCT Filed: Aug. 23, 2018

(86) PCT No.: PCT/JP2018/031246
§ 371 (c)(1),
(2) Date: May 6, 2020

(87) PCT Pub. No.: WO2019/039566
PCT Pub. Date: Feb. 28, 2019

(65) Prior Publication Data
US 2020/0313180 A1 Oct. 1, 2020

(30) Foreign Application Priority Data
Aug. 25, 2017 (JP) .................................. 2017-162661

(51) Int. Cl.
*H01M 4/525* (2010.01)
*H01M 4/131* (2010.01)
(Continued)

(52) U.S. Cl.
CPC .......... *H01M 4/525* (2013.01); *H01M 4/131* (2013.01); *H01M 4/1391* (2013.01);
(Continued)

(58) Field of Classification Search
None
See application file for complete search history.

(56) References Cited

U.S. PATENT DOCUMENTS

2014/0159675 A1* 6/2014 Kodama ............... H01M 4/505
429/162
2014/0170494 A1 6/2014 Paulsen et al.
(Continued)

FOREIGN PATENT DOCUMENTS

| CN | 110679018 A | 1/2020 |
|---|---|---|
| JP | 2004-335278 A | 11/2004 |

(Continued)

OTHER PUBLICATIONS

International Search Report dated Nov. 27, 2018, issued in counterpart PCT/JP2018/031246, with English Translation. (5 pages).
(Continued)

*Primary Examiner* — Carlos Barcena
(74) *Attorney, Agent, or Firm* — WHDA, LLP

(57) ABSTRACT

The positive electrode active material is for a non-aqueous electrolyte secondary battery, suppressing deterioration of battery characteristics due to exposure to the atmosphere and having excellent battery capacity. A positive electrode active material for a non-aqueous electrolyte secondary battery includes a lithium-nickel composite oxide represented by general formula (1): $Li_aNi_{1-x-y}Co_xM_yO_{2+\alpha}$ (in which $0.05 \leq x \leq 0.35$, $0 \leq y \leq 0.10$, $0.95 \leq a \leq 1.10$, $0 \leq \alpha \leq 0.2$, and M represents at least one element selected from Mn, V, Mg, Mo, Nb, Ti, W, and Al) and $Li_3BO_3$. At least a part of a surface of the lithium-nickel composite oxide is coated with
(Continued)

Li$_3$BO$_3$. The content of boron in the positive electrode active material is 0.001% by mass or more and 0.2% by mass or less with respect to the entire positive electrode active material.

4 Claims, 2 Drawing Sheets

(51) Int. Cl.
*H01M 4/1391* (2010.01)
*H01M 4/505* (2010.01)
*H01M 10/0525* (2010.01)
*H01M 50/46* (2021.01)
*H01M 4/02* (2006.01)

(52) U.S. Cl.
CPC ....... *H01M 4/505* (2013.01); *H01M 10/0525* (2013.01); *H01M 50/46* (2021.01); *H01M 2004/027* (2013.01); *H01M 2004/028* (2013.01)

(56) References Cited

U.S. PATENT DOCUMENTS

| | | |
|---|---|---|
| 2016/0118656 A1 | 4/2016 | Nakayama et al. |
| 2018/0323428 A1 | 11/2018 | Nakayama et al. |
| 2018/0351169 A1 † | 12/2018 | Oh |
| 2019/0165360 A1 | 5/2019 | Saruwatari et al. |
| 2019/0190018 A1 * | 6/2019 | Aoki ................... H01M 4/366 |
| 2019/0312279 A1 | 10/2019 | Otsuka et al. |
| 2020/0251732 A1 | 8/2020 | Ryoshi et al. |

FOREIGN PATENT DOCUMENTS

| | | | |
|---|---|---|---|
| JP | 2009-146739 A | | 7/2009 |
| JP | 2012-089406 A | | 5/2012 |
| JP | 2014-513392 A | | 5/2014 |
| JP | 2015-201431 A | | 11/2015 |
| JP | 2015201431 A | † | 11/2015 |
| KR | 20150050458 A | † | 5/2015 |
| WO | 2014/189108 A1 | | 11/2014 |
| WO | 2017/199891 A1 | | 11/2017 |
| WO | 2018/043515 A1 | | 3/2018 |

OTHER PUBLICATIONS

International Preliminary Report on Patentability (Form PCT/IB/373) issued in counterpart International Application No. PCT/JP2018/031246 dated Feb. 25, 2020, with Form PCT/ISA/237, with English Translation. (11 pages).

Office Action dated Sep. 7, 2022, issued in counterpart CN application No. 20180055131.6 with English translation. (24 pages).

* cited by examiner
† cited by third party

POSITIVE ELECTRODE ACTIVE MATERIAL FOR NON-AQUEOUS ELECTROLYTE SECONDARY BATTERY AND METHOD FOR PRODUCING THE SAME, AND NON-AQUEOUS ELECTROLYTE SECONDARY BATTERY AND METHOD FOR PRODUCING THE SAME

TECHNICAL FIELD

The present invention relates to a positive electrode active material for a non-aqueous electrolyte secondary battery and a method for producing the same, and a non-aqueous electrolyte secondary battery and a method for producing the same.

BACKGROUND ART

In recent years, with widespread use of a portable electronic device such as a mobile phone or a notebook personal computer, development of a small and lightweight non-aqueous electrolyte secondary battery having high energy density has been desired. In addition, development of a secondary battery having high output has been desired as a battery for an electric car including a hybrid car.

There is a lithium ion secondary battery as a non-aqueous electrolyte secondary battery satisfying such requirements. This lithium ion secondary battery includes a negative electrode, a positive electrode, a non-aqueous electrolyte, and the like. As an active material of each of the negative electrode and the positive electrode, a material capable of insertion and de-insertion of lithium is used. The lithium ion secondary battery is currently being actively studied and developed. Particularly, a lithium ion secondary battery using a layered or spinel type lithium-metal composite oxide as a positive electrode active material can obtain a high voltage at a level of 4 V and therefore has been put into practical use as a battery having a high energy density.

Examples of a typical positive electrode active material that has been proposed 30 far include a lithium-cobalt composite oxide ($LiCoO_2$) which is relatively easily synthesized, a lithium-nickel composite oxide ($LiNiO_2$) using nickel which is cheaper than cobalt, a lithium nickel cobalt manganese composite oxide ($LiNi_{1/3}Co_{1/3}Mn_{1/3}O_2$), and a lithium-manganese composite oxide ($LiMn_2O_4$) using manganese.

A secondary battery using a lithium-cobalt composite oxide out of these compounds has been often developed in order to obtain excellent initial capacity characteristics and cycle characteristics, and various results have already been obtained. However, since the lithium-cobalt composite oxide uses an expensive cobalt compound as a raw material, a unit price per capacity of the secondary battery when the lithium-cobalt composite oxide is used is significantly higher than that of a nickel-metal hydride battery.

Therefore, not only for a small secondary battery for a portable electronic device but also for a large secondary battery for power storage, an electric car, or the like, there is large expectation to reduce cost of a positive electrode active material, and to make it possible to manufacture a cheaper lithium ion secondary battery. Achievement thereof has a large industrial significance.

Examples of another material for an active material for a lithium ion secondary battery include a lithium-nickel composite oxide using nickel which is cheaper than cobalt. This lithium-nickel composite oxide exhibits a lower electrochemical potential than a lithium-cobalt composite oxide. Therefore, in the lithium-nickel composite oxide, a problem of decomposition due to oxidation of an electrolyte solution hardly occurs, higher capacity can be expected, and high battery voltage is exhibited as in the cobalt-based oxide. Therefore, development of the lithium-nickel composite oxide is actively performed.

However, in the lithium-nickel composite oxide, moisture in the atmosphere reacts with a surface of the lithium-nickel composite oxide, and lithium is extracted from the inside of a crystal. This easily accelerates atmospheric deterioration of a positive electrode active material causing a decrease in capacity and an increase in reaction resistance (positive electrode resistance) of a positive electrode disadvantageously. Particularly, in a lithium-nickel composite compound having a high nickel ratio, high battery capacity can be obtained, but reactivity with the atmosphere is high, and therefore deterioration of battery characteristics due to the atmosphere becomes more disadvantageous. Therefore, a battery using the lithium-nickel composite oxide as a positive electrode active material requires special equipment such as a dry room in a process of manufacturing the battery. This hinders market expansion.

CITATION LIST

Patent Literature

Patent Literature 1: JP 2004-335278 A
Patent Literature 2: JP 2012-089406 A

SUMMARY OF INVENTION

Technical Problem

In view of the above problems, an object of the present invention is to provide a positive electrode active material for a non-aqueous electrolyte secondary battery, suppressing deterioration of battery characteristics due to the atmosphere and having excellent battery capacity when the positive electrode active material is used in a secondary battery.

By the way, some proposals to improve battery characteristics by adding a compound containing boron or the like to a positive electrode active material have been made. For example, Patent Literature 1 proposes a positive electrode active material in which a lithium-transition metal composite oxide is in a form of particles and contains lithium borate at least on surfaces of the particles. Patent Literature 1 describes that this positive electrode active material improves thermal stability.

Patent Literature 2 proposes a method for producing a positive electrode active material part including a positive electrode active material and a coating layer coating a surface of the positive electrode active material and formed of $Li_3BO_3$. Patent Literature 2 describes that an increase in interfacial resistance between the positive electrode active material and a solid electrolyte material over time can be suppressed, and a solid lithium battery having excellent, durability can be obtained.

However, the Patent Literatures 1 and 2 do not describe any influence on battery characteristics in a secondary battery due to exposure of a positive electrode active material to the atmosphere. Example of Patent Literature 2 describes only a positive electrode active material part having a coating layer formed of $Li_3BO_3$—$Li_4SiO_4$.

Solution to Problem

In order to solve the above problems, the present inventor made intensive studies on suppression of deterioration of battery characteristics due to the atmosphere of a lithium-metal composite oxide used as a positive electrode active material for a non-aqueous electrolyte secondary battery. As a result, the present inventor has found that deterioration of battery characteristics (an increase in reaction of a positive electrode and a decrease in battery capacity) due to the atmosphere can be suppressed when a positive electrode active material obtained by coating a surface of a lithium-nickel composite oxide with $Li_3BO_3$ is used for a positive electrode, and has completed the present invention.

A first aspect of the present invention provides a positive electrode active material for a non-aqueous electrolyte secondary battery, including a lithium-nickel composite oxide represented by general formula (1): $Li_aNi_{1-x-y}Co_xM_yO_{2+\alpha}$ (in which $0.05 \leq x \leq 0.35$, $0 \leq y \leq 0.10$, $0.95 \leq a \leq 1.10$, $0 \leq \alpha \leq 0.2$, and M represents at least one element selected from Mn, V, Mg, Mo, Nb, Ti, W, and Al) and $Li_3BO_3$, in which at least a part of a surface of the lithium-nickel composite oxide is coated with $Li_3BO_3$, and the content of boron in the positive electrode active material is 0.001% by mass or more and 0.2% by mass or less with respect to the entire positive electrode active material.

At least a part of the surface of the lithium-nickel composite oxide is preferably coated with $Li_2BO_3$ alone.

A second aspect of the present invention provides a method for producing a positive electrode active material for a non-aqueous electrolyte secondary battery, including a lithium-nickel composite oxide represented by general formula (1): $Li_aNi_{1-x-y}Co_xM_yO_{2+\alpha}$ (in which $0.05 \leq x \leq 0.35$, $0 \leq y \leq 0.10$, $0.95 \leq a \leq 1.10$, $0 \leq \alpha \leq 0.2$, and M represents at least one element selected from Mn, V, Mg, Mo, Nb, Ti, W, and Al) and $Li_3BO_3$, the method including: mixing a boron compound, at least one of a nickel composite hydroxide and a nickel composite oxide, and a lithium compound to obtain a lithium mixture; and firing the lithium mixture in an oxygen atmosphere at a temperature of 715° C. or higher and 850° C. or lower to obtain a lithium-nickel composite oxide, in which the boron compound is mixed in an amount such that the content of boron is 0.001% by mass or more and 0.2% by mass or less with respect to the entire positive electrode active material, and at least a part of a surface of the obtained lithium-nickel composite oxide is coated with $Li_3BO_3$.

The boron compound is preferably at least one selected from $H_3BO_3$, $B_2O_3$, and $LiBO_2$. The lithium compound is preferably lithium hydroxide. The lithium compound preferably contains lithium hydroxide. At least a part of the surface of the lithium-nickel composite oxide is preferably coated with $Li_3BO_3$ alone.

A third aspect of the present invention provides a non-aqueous electrolyte secondary battery including a positive electrode, a negative electrode, a separator, and a non-aqueous electrolyte, in which the positive electrode includes the above positive electrode active material.

A fourth aspect of the present invention provides a method for producing a non-aqueous electrolyte secondary battery, including assembling the non-aqueous electrolyte secondary battery in the atmosphere.

Advantageous Effects of Invention

The present invention provides a positive electrode active material for a non-aqueous electrolyte secondary battery, suppressing deterioration of battery characteristics due to exposure of a positive electrode active material to the atmosphere and having excellent battery capacity when the positive electrode active material is used as a positive electrode material of a secondary battery. Furthermore, a method for producing the positive electrode active material is easy and suitable for manufacture on an industrial scale, and industrial value thereof is extremely large.

DESCRIPTION OF EMBODIMENTS

Figure 1:
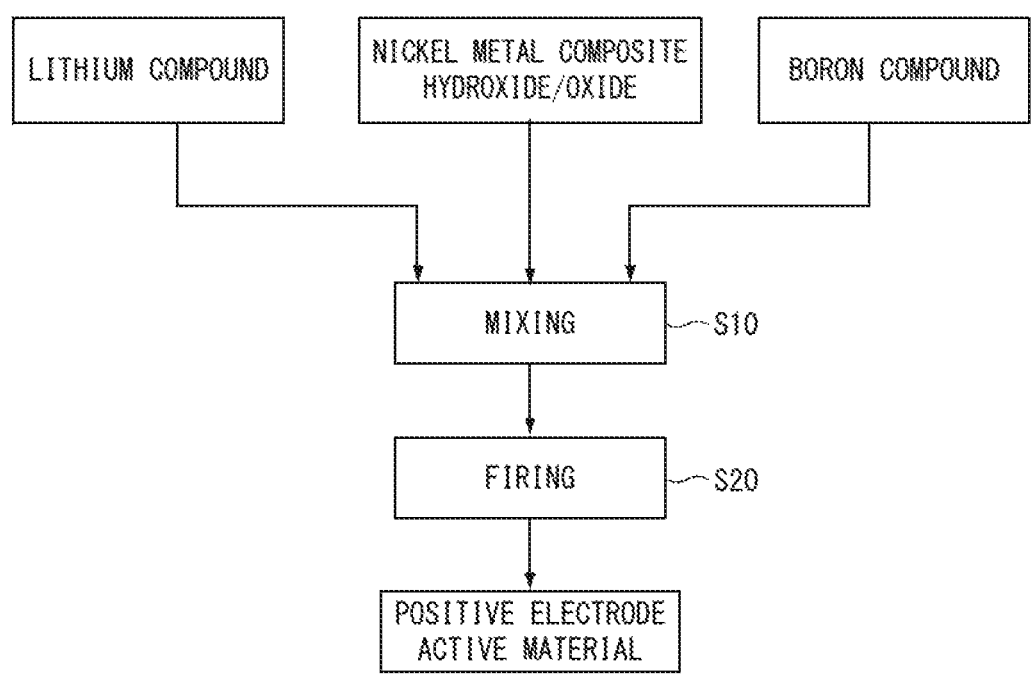
FIG. 1 is a diagram illustrating an example of a method for producing a positive electrode active material according to the present embodiment.

Hereinafter, regarding the present invention, an example of a positive electrode active material for a non-aqueous electrolyte secondary battery according to the present embodiment will be described, and then a method for producing the same and a non-aqueous electrolyte secondary battery using the positive electrode active material according to the present embodiment will be described. Note that the present invention is not limited to the following detailed description.

1. Positive Electrode Active Material for Non-Aqueous Electrolyte Secondary Battery The positive electrode active material for a non-aqueous electrolyte secondary battery according to the present embodiment (hereinafter also referred to as "positive electrode active material") includes a lithium-nickel composite oxide and $Li_3BO_3$, and at least a part of a surface of the lithium-nickel composite oxide is coated with $Li_3BO_3$.

The lithium-nickel composite oxide is represented by general formula (1): $Li_aNi_{1-x-y}Co_xM_yO_{2+\alpha}$ (in which $0.05 \leq x \leq 0.35$, $0 \leq y \leq 0.10$, $0.95 \leq a \leq 1.10$, $0 \leq \alpha \leq 0.2$, and M represents at least one element selected from Mn, V, Mg, Mo, Mb, Ti, W, and Al) and forms a layered crystal structure. The lithium-nickel composite oxide includes a secondary particle with a plurality of aggregated primary particles.

In the general formula (1), (1−x−y) indicating the amount of nickel satisfies $0.55 \leq (1-x-y) \leq 0.95$. The positive electrode active material according to the present embodiment can sufficiently suppress deterioration of battery characteristics due to the atmosphere by coating a surface of the lithium-nickel composite oxide with $Li_3BO_3$ even when the amount of nickel is within the above range.

In the general formula (I), x indicating the amount of cobalt satisfies $0.05 \leq x \leq 0.35$. When the amount of cobalt is within the above range, cycle characteristics are excellent while high battery capacity is maintained. M is at least one element selected from the group consisting of Mn, V, Mg, Mo, Nb, Ti, W, and Al, and preferably contains Al from a viewpoint of thermal stability of a positive electrode active material. The value of y indicating the amount of M preferably satisfies $0.01 \leq y \leq 0.10$.

In the above general formula (1), the value of a indicates the amount of Li (Li/Me) with respect to the total amount of Ni, Co, and M (Me amount), and satisfies $0.95 \leq a \leq 1.10$. Note that the value of a also includes the amount of Li contained in $Li_3BO_3$. As described later, $Li_3BO_3$ is formed by a reaction between a boron compound and a lithium compound in a lithium-nickel composite oxide used as a raw material in a firing step, and therefore the value of a may be 1 or more.

The positive electrode active material according to the present embodiment can suppress deterioration of battery characteristics due to contact between the lithium-nickel composite oxide and the atmosphere by coating at least a part of a surface of the lithium-nickel composite oxide with $Li_3BO_3$. The positive electrode active material according to the present embodiment may contain lithium borate other than $Li_3BO_3$, and may contain, for example, $LiBO_2$, lithium tetraborate, or lithium pentaborate. As the lithium borate other than $Li_3BO_3$, $LiBO_2$ is preferably contained.

Examples of the lithium borate coating a surface of the lithium-nickel composite oxide include $LiBO_2$, lithium tetraborate, and lithium pentaborate in addition to $Li_3BO_3$. Among these compounds, $Li_3BO_3$ alone is particularly preferably used. When a surface of the lithium-nickel composite oxide is coated with $Li_3BO_3$ alone, the above effect can be exhibited more significantly. Note that presence of lithium borate on a surface of the lithium-nickel composite oxide can be confirmed by powder X-ray diffraction. In the positive electrode active material, $Li_3BO_3$ alone is more preferably detected as lithium borate by powder X-ray diffraction. Note that a surface of the lithium-nickel composite oxide can be coated with $Li_3BO_3$ by a method described later.

In the positive electrode active material according to the present embodiment, at least a part of a surface of the lithium-nickel composite oxide is more preferably coated with $Li_3BO_3$ alone. Note that the phrase "coated with $Li_3BO_3$ alone" refers to a state in which only a diffraction peak of $Li_3BO_3$ is detected as a diffraction peak other than that derived from the lithium-nickel composite oxide in powder X-ray diffraction.

The content of boron contained in the positive electrode active material is 0.001% by mass or more and 0.2% by mass or less, preferably 0.005% by mass or more and 0.1% by mass or less, and more preferably 0.01% by mass or more and 0.08% by mass or less with respect to the entire positive electrode active material. When the content of boron is within the above range, deterioration of battery characteristics such as reduction in discharge capacity due to exposure to the atmosphere can be suppressed in a case of use as a positive electrode active material of a secondary battery. In general, when a surface of the lithium-nickel composite oxide is coated with a compound containing different elements, battery characteristics such as reaction resistance of the positive electrode may be deteriorated. However, $Li_3BO_3$ has high lithium conductivity. Therefore, when the content of boron is within the above range, even if the surface is coated, deterioration of battery characteristics in a secondary battery can be suppressed.

Meanwhile, when the content of boron is less than 0.001% by mass, an effect of suppressing deterioration of battery characteristics due to exposure to the atmosphere cannot be sufficiently obtained. Details of this reason are not clear. However, it is considered that a $Li_3BO_3$ layer formed on a surface of the lithium-nickel composite oxide becomes too thin. When the content of boron exceeds 0.2% by mass, battery characteristics in a secondary battery may be deteriorated. Details of this reason are not clear. However, it is considered that a $Li_3BO_3$ layer formed on a surface of the lithium-nickel composite oxide becomes too thick to increase reaction resistance of the positive electrode.

Note that it is difficult to directly measure formation of the $Li_3BO_3$ layer in the positive electrode active material according to the present embodiment. However, as illustrated in Examples described later, by measuring a change amount (%) between initial discharge capacity after leaving the obtained positive electrode active material at 80° C. in the atmosphere for 24 hours and initial discharge capacity before exposure to the atmosphere, the degree of formation of the $Li_3BO_3$ layer on a surface of the lithium-nickel composite oxide can be indirectly evaluated. For example, in the positive electrode active material according to the present embodiment, the change amount (%) determined by the following formula is preferably 4% or less, and more preferably 2% or less under conditions described in Examples. When the change amount of the initial discharge capacity is within the above range, an evaluation that the $Li_3BO_3$ layer having an appropriate thickness and coating range has been formed can be made. Note that a lower limit of the change amount (%) can be 0% or more, but may be 0.1% or more or 0.5% or more.

Formula: Change amount (%) in initial discharge capacity={[Initial discharge capacity before exposure to atmosphere (mAh/g)]−[Initial discharge capacity after exposure to atmosphere (mAh/g)]}×100/[Initial discharge capacity before exposure to atmosphere (mAh/g)]

The positive electrode active material according to the present embodiment does not need to substantially contain one or more of carbon (C), sulfur (S), and silicon (Si). Specifically, in the positive electrode active material, for example, the content of carbon (C) may be 0.04% by mass or less or may be less than 0.01% by mass of the entire positive electrode active material, and the positive electrode active material does not need to contain carbon (C). In the positive electrode active material, for example, the content of sulfur (S) may be 0.04% by mass or less or may be less than 0.01% by mass of the entire positive electrode active material, and the positive electrode active material does not need to contain sulfur (S). In the positive electrode active material, for example, the content of silicon (Si) may be less than 0.01% by mass or may be less than 0.001% by mass of the entire positive electrode active material, and the positive electrode active material does not need to contain silicon (Si). The contents of carbon (C), sulfur (S), and silicon (Si) can be measured with, for example, a carbon sulfur analyzer or an ICP emission spectroscopic analyzer.

2. Method for Producing Positive Electrode Active Material for Non-Aqueous Electrolyte Secondary Battery Next, with reference to FIG. 1, a method for producing a positive electrode active material for a non-aqueous electrolyte secondary battery according to the present embodiment (hereinafter also referred to as "method for producing a positive electrode active material") will be described. FIG. 1 is a diagram illustrating an example of a method for producing a positive electrode active material. By this method for producing a positive electrode active material, the above-described positive electrode active material containing a lithium-nickel composite oxide in which at least a part of a surface is coated with $Li_3BO_3$ can be obtained with high productivity on an industrial scale.

The method for producing a positive electrode active material according to the present embodiment includes: mixing a boron compound, at least one of a nickel composite hydroxide and a nickel composite oxide, and a lithium compound to obtain a lithium mixture (step S10); and firing the lithium mixture in an oxygen atmosphere at a temperature of 715° C. or higher and 850° C. or lower to obtain a lithium-nickel composite oxide (step S20). Hereinafter, each step will be described.

First, a boron compound, at least one of a nickel composite hydroxide and a nickel composite oxide, and a lithium compound are mixed to obtain a lithium mixture (step S10).

As the boron compound, a compound containing boron capable of reacting with lithium can be used. Examples thereof include boron oxide ($B_2O_3$), boric acid ($H_3BO_3$), ammonium tetraborate tetrahydrate (($NH_4$)$2B_4O_7 \cdot 4H_2O$), ammonium pentaborate octahydrate ((NH$_4$)$_2$O·5B$_2$O$_3$·8H$_2$O), and LiBO$_2$. Among these compounds, at least one selected from H$_3$BO$_3$, B$_2$O$_5$, and LiBO$_2$ is preferably used, and at least one of H$_3$BO$_3$ and B$_2$O$_3$ is more preferably used. H$_3$BO$_3$ and B$_2$O$_3$ are acidic and therefore highly reactive with Li. These compounds are highly reactive with a lithium salt, and are considered to form Li$_3$BO$_3$ after the firing step (step S20) described later.

The boron compound is mixed in such an amount that boron in the boron compound is 0.001% by mass or more and 0.2% by mass or less, preferably 0.005% by mass or more and 0.1% by mass or less, and more preferably 0.01% by mass or more and 0.08% by mass or less with respect to the entire positive electrode active material obtained.

The nickel composite hydroxide and the nickel composite oxide are not particularly limited, and known compounds can be used. Examples thereof include a nickel composite hydroxide obtained by a crystallization method and a nickel composite oxide obtained by oxidizing and firing (thermally treating) the nickel composite hydroxide. As a method for producing the nickel composite hydroxide, either a batch method or a continuous method can be applied. The continuous method for continuously collecting nickel composite hydroxide particles overflowing from a reaction vessel is preferable from viewpoints of cost and filling property. The batch method is preferable from a viewpoint of obtaining particles with higher uniformity.

Examples of the lithium compound include lithium hydroxide, lithium carbonate, lithium nitrate, and lithium acetate. Among these compounds, lithium hydroxide and lithium carbonate are preferable, and lithium hydroxide is more preferable from a viewpoint of reactivity with the boron compound.

The lithium compound is mixed in such an amount that the ratio (Li/Me) of the number of atoms of lithium (Li) to the total number of atoms (Me) of metal elements other than lithium is 0.95 or more and 1.10 or less. When Li/Me is less than 0.95, since reaction resistance of a positive electrode in a secondary battery using the obtained positive electrode active material is large, a battery output is low. When Li/Me exceeds 1.10, the initial discharge capacity of the obtained positive electrode active material is reduced, and the reaction resistance of the positive electrode is also increased.

In the mixing step (step S10), the boron compound, the nickel composite hydroxide and/or the nickel composite oxide, and the lithium compound are preferably mixed sufficiently. For mixing these compounds, a general mixer can be used, and examples thereof include a shaker mixer, a Loedige mixer, a Julia mixer, and a V blender. It is only required to perform mixing with the lithium compound sufficiently to such an extent that the shapes of the composite hydroxide particles are not destroyed.

Next, the lithium mixture is fired in an oxygen atmosphere at a temperature of 715° C. or higher and 850° C. or lower to obtain a lithium-nickel composite oxide (step S20) By firing the lithium mixture containing the boron compound the lithium-nickel composite oxide is generated, and Li$_3$BO$_3$ can be generated at the same time. Note that boron is hardly solid-solved in the lithium-nickel composite oxide. Therefore, it is considered that most of boron added as the boron compound forms Li$_3$BO$_3$.

The firing temperature is 715° C. or higher and 850° C. or lower, preferably 715° C. or higher and 800° C. or lower, and more preferably 720° C. or higher and 780° C. or lower. When the firing temperature is within the above range, a surface of the lithium-nickel composite oxide can be uniformly coated with a Li$_3$BO$_3$ layer. When the firing temperature is 715° C. or higher, since the melting point of Li$_3$BO$_3$ is 715° C., Li$_3$BO$_3$ formed by a reaction between the boron compound and the lithium compound can be sufficiently melted. As a result, a surface of the lithium-nickel composite oxide can be uniformly coated with the Li$_3$BO$_3$ layer. Meanwhile, when the firing temperature is lower than 715° C., Li$_3$BO$_3$ is not melted sufficiently. Therefore, coating with the Li$_3$BO$_3$ layer on the surface of the lithium-nickel composite oxide is non-uniform, and deterioration of battery characteristics due to exposure to the atmosphere cannot be sufficiently suppressed. When the firing temperature exceeds 850° C., the lithium-nickel composite oxide is decomposed, and the battery characteristics are deteriorated. Therefore, the firing temperature exceeding 850° C. is not preferable.

Holding time at the firing temperature is, for example, about 5 hours or more and 20 hours or less, and preferably about 5 hours or more and 10 hours or less. The atmosphere during firing is an oxygen atmosphere, and is preferably an atmosphere having an oxygen concentration of 100% by volume, for example.

3. Non-Aqueous Electrolyte Secondary Battery

The non-aqueous electrolyte secondary battery (hereinafter also referred to as "secondary battery") according to the present embodiment includes a positive electrode including the positive electrode active material described above as a positive electrode material. The secondary battery can include similar components to those of a conventionally known non-aqueous electrolyte secondary battery. The secondary battery may include, for example, a positive electrode, a negative electrode, and a non-aqueous electrolyte solution, or may include a positive electrode, a negative electrode, and a solid electrolyte.

As described above, the positive electrode active material according to the present embodiment can suppress deterioration of battery characteristics such as a decrease in discharge capacity due to exposure to the atmosphere. Therefore, the secondary battery can be assembled in the atmosphere although the assembly has required special equipment such as a dry room so far. Hereinafter, an example of a method for producing a secondary battery according to the present embodiment will be described.

Note that an embodiment described below is merely an example, and the non-aqueous electrolyte secondary battery according to the present embodiment can be implemented in various modified forms or improved forms on the basis of knowledge of those skilled in the art on the basis of the embodiment described here. Use of the non-aqueous electrolyte secondary battery according to the present embodiment is not particularly limited.

(Positive Electrode)

Using the positive electrode active material for a non-aqueous electrolyte secondary battery obtained as described above, for example, a positive electrode of a non-aqueous electrolyte secondary battery is manufactured as follows.

First, a powdered positive electrode active material, a conductive material, and a binding agent are mixed, activated carbon and a solvent for viscosity adjustment or the like are further added as necessary, and the resulting mixture is kneaded to manufacture a positive electrode mixture paste. At this time, a mixing ratio among the components in the positive electrode mixture paste is also an important factor for determining performance of a non-aqueous electrolyte secondary battery. When the solid content of the positive electrode mixture excluding the solvent is 100 mass parts, similarly to a positive electrode of a general non-aqueous electrolyte secondary battery, desirably, the content of the positive electrode active material is 60 to 95 mass parts, the content of the conductive material is 1 to 20 mass parts, and the content of the binding agent is 1 to 20 mass parts.

The obtained positive electrode mixture paste is applied to, for example, a surface of an aluminum foil current collector and dried to scatter the solvent. Pressurization may be performed by roll press or the like in order to increase electrode density as necessary. In this way, a sheet-like positive electrode can be manufactured. The sheet-like positive electrode can be cut into an appropriate size according to a target battery and used for producing a battery. However, the method for producing a positive electrode is not limited to the above-described example, and another method may be used.

In producing a positive electrode, examples of the conductive material include graphite (natural graphite, artificial graphite, expanded graphite, and the like), and a carbon black-based material such as acetylene black or ketjen black.

The binding agent plays a role of bonding active material particles together, and examples thereof include polyvinylidene fluoride (PVDF), polytetrafluoroethylene (PTFE), a fluorine-containing rubber, an ethylene propylene diene rubber, styrene butadiene, a cellulose-based resin, and polyacrylic acid.

A solvent that disperses the positive electrode active material, the conductive material, and the activated carbon and dissolves the binding agent is added to the positive electrode mixture as necessary. Specifically, an organic solvent such as N-methyl-2-pyrrolidone can be used as the solvent. Activated carbon can be added to the positive electrode mixture in order to increase electric double layer capacity.

(Negative Electrode)

For a negative electrode, metal lithium, a lithium alloy, or the like may be used. Alternatively, a negative electrode may be formed by mixing a binding agent with a negative electrode active material that can occlude and desorb lithium ions, adding an appropriate solvent, thereto to form a paste-like negative electrode mixture, applying the paste-like negative electrode mixture to a surface of a metal foil current collector such as copper, drying the negative electrode mixture, and compressing the resulting product in order to increase the electrode density as necessary.

Examples of the negative electrode active material include natural graphite, artificial graphite, a fired organic compound such as a phenol resin, and a powdery carbon material such as coke. In this case, as a negative electrode binding agent, as in the positive electrode, a fluorine-containing resin such as PVDF can be used. As a solvent for dispersing the active material and the binding agent, an organic solvent such as N-methyl-2-pyrrolidone can be used.

(Separator)

A separator is interposed between the positive electrode and the negative electrode. The separator separates the positive electrode and the negative electrode from each other and retains an electrolyte, and a thin film formed of polyethylene, polypropylene, or the like and having many minute holes can be used.

(Non-Aqueous Electrolyte)

As the non-aqueous electrolyte, a non-aqueous electrolyte solution can be used. As the non-aqueous electrolyte solution, for example, a solution obtained by dissolving a lithium salt as a supporting salt in an organic solvent may be used. As the non-aqueous electrolyte solution, a solution obtained by dissolving a lithium salt in an ionic liquid may be used.

Note that the ionic liquid refers to a salt including a cation other than a lithium ion and an anion, and being in a liquid state even at room temperature.

As the organic solvent, one selected from a cyclic carbonate such as ethylene carbonate, propylene carbonate, butylene carbonate, or trifluoropropylene carbonate, a chain carbonate such as diethyl carbonate, dimethyl carbonate, ethyl methyl carbonate, or dipropyl carbonate, an ether compound such as tetrahydrofuran, 2-methyltetrahydrofuran, or dimethoxyethane, a sulfur compound such as ethylmethylsulfone or butanesultone, and a phosphorus compound such as triethyl phosphate or trioctyl phosphate may be used singly, or two or more selected from these compounds may be mixed to be used.

Examples of the supporting salt include $LiPF_6$, $LiBF_4$, $LiClO_4$, $LiAsF_6$, $LiN(CF_3SO_2)_2$, and a composite salt thereof. Furthermore, the non-aqueous electrolyte solution may contain a radical scavenger, a surfactant, a flame retardant, and the like.

As the non-aqueous electrolyte, a solid electrolyte may be used. The solid electrolyte can withstand a high voltage. Examples of the solid electrolyte include an inorganic solid electrolyte and an organic solid electrolyte.

Examples of the inorganic solid electrolyte include an oxide-based solid electrolyte and a sulfate-based solid electrolyte.

The oxide-based solid electrolyte is not particularly limited, and any compound containing oxygen (O) and having lithium ion conductivity and electronic insulation can be used. Examples of the oxide-based solid electrolyte include lithium phosphate ($Li_3PO_4$, $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ (0≤X≤1), $Li_{1+x}Al_xGe_{2-x}(PO_4)_3$ (0≤X≤1), $LiTi_2(PO_4)_3$, $Li_{3x}La_{2/4-x}TiO_3$ (0≤X≤⅔), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$.

The sulfide-based solid electrolyte is not particularly limited, and any compound containing sulfur (S) and having lithium ion conductivity and electronic insulation can be used. Examples of the sulfide-based solid electrolyte include $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$P_2O_5$, and $LiI$—$Li_3PO_4$—$P_2S_5$.

Note that as the inorganic solid electrolyte, compounds other than the compounds described above may be used. For example, $Li_3N$, $LiI$, or $Li_3N$—$LiI$—$LiOH$ may be used.

The organic solid electrolyte is not particularly limited as long as being a polymer compound exhibiting ionic conductivity, and examples thereof include polyethylene oxide, polypropylene oxide, and copolymers thereof. The organic solid electrolyte may contain a supporting salt (lithium salt).

(Shape of Battery and Configuration Thereof)

The non-aqueous electrolyte secondary battery of the present invention, constituted by the positive electrode, the negative electrode, the separator, and the non-aqueous electrolyte solution described above can have various shapes such as a cylindrical shape and a laminated shape.

Even when the non-aqueous electrolyte secondary battery has any shape, the positive electrode and the negative electrode are laminated via the separator to form an electrode body, the obtained electrode body is impregnated with the non-aqueous electrolyte solution, a positive electrode current collector is connected to a positive electrode terminal communicating with the outside using a current collecting lead or the like, a negative electrode current collector is connected to a negative electrode terminal communicating with the outside using a current collecting lead or the like, and the resulting product is sealed in a battery case to complete the non-aqueous electrolyte secondary battery.

EXAMPLES

Hereinafter, the present invention will be described in more detail with reference to Examples and Comparative Examples of the present invention, but the present invention is never limited by these Examples. Note that Examples and Comparative Examples were evaluated by measurement results obtained by using the following apparatuses and methods.

[Composition of Entire Positive Electrode Active Material]

The obtained positive electrode active material was dissolved in nitric acid, and then measured with an ICP emission spectroscopic analyzer (ICPS-8100 manufactured by Shimadzu Corporation).

[Identification of Compound Species]

The obtained positive electrode active material was evaluated with an X-ray diffractometer (trade name: X'Pert PRO manufactured by PANalytical Ltd.).

[Evaluation of Battery Characteristics]

(Manufacture of Coin-Type Battery for Evaluation)

Figure 2:
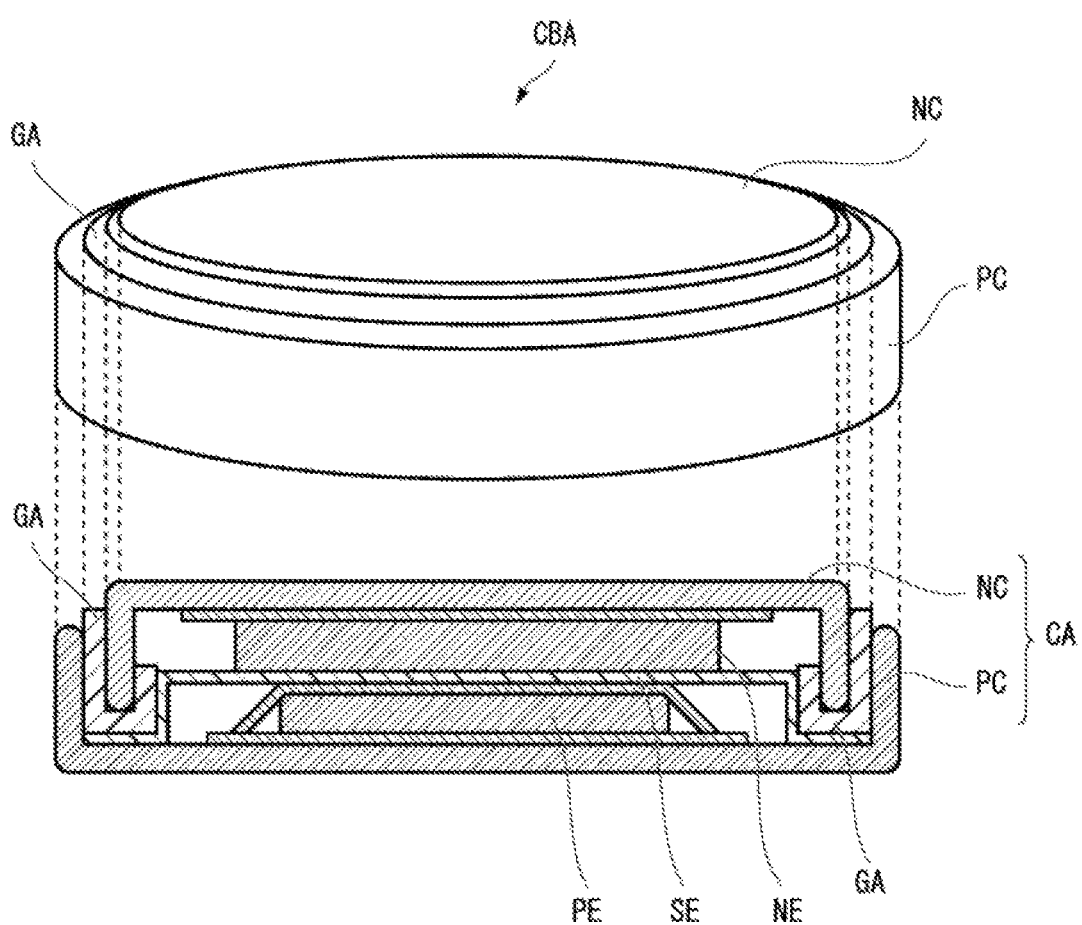
FIG. 2 is a schematic cross-sectional view of a coin-type battery used for battery evaluation.

70% by mass of the obtained positive electrode active material was mixed with 20% by mass of acetylene black and 10% by mass of PTFE, and 150 mg of the resulting mixture was taken out to be manufactured into a pellet. This was used as a positive electrode. Using lithium metal as a negative electrode, and using an equal volume mixed solution of ethylene carbonate (EC) and diethyl carbonate (DEC) with 1M $LiClO_4$ as a supporting salt (manufactured by Toyama Pharmaceutical Co., Ltd.) as an electrolyte solution, a 2032 type coin-type battery CBA as illustrated in FIG. 2 was manufactured in a globe box in an Ar atmosphere with a dew point controlled at −80° C. Performance of the manufactured coin-type battery CBA was evaluated on the basis of initial discharge capacity.

(Initial Discharge Capacity)

For the initial discharge capacity, discharge capacity was measured when the coin-type battery CBA was left about 24 hours after manufacture thereof to stabilize an open circuit voltage (OCV), then the battery was charged to a cutoff voltage of 4.3 V at a current density of 0.1 mA/cm² with respect to the positive electrode, the battery paused for one hour, and then the battery was discharged to a cutoff voltage of 3.0 V. This discharge capacity was taken as initial discharge capacity before exposure to the atmosphere.

(Initial Discharge Capacity After Exposure to the Atmosphere)

For initial discharge capacity after exposure to the atmosphere, the obtained positive electrode active material was left at 80° C. in the atmosphere with a dew point of 15° C. for 24 hours, and then a coin-type battery CBA for evaluation was manufactured under similar conditions to the above. The initial discharge capacity was measured under similar conditions to the above. A change amount (%) in the initial discharge capacity was determined by the following formula.

{[Initial discharge capacity before exposure to atmosphere (mAh/g)]−[Initial discharge capacity after exposure to atmosphere (mAh/g)]}×100/[Initial discharge capacity before exposure to atmosphere (mAh/g)]     Formula:

Example 1

To nickel composite hydroxide particles having an average particle size of 13 μm, $H_3BO_3$ (manufactured by Wako Pure Chemical Industries, Ltd.) was added in an amount of boron of 0.03% by mass with respect to a positive electrode active material obtained, and lithium hydroxide was mixed therewith such that Li/Me satisfied Li/Me=1.02 to form a mixture. Mixing was performed using a shaker mixer (TURBULA TypeT2C manufactured by Willy A. Bachofen (WAB)). The obtained mixture was fired at 750° C. for eight hours in an oxygen stream (oxygen: 100% by volume), cooled, and then crushed to obtain a positive electrode active material. The obtained positive electrode active material was a lithium-nickel composite oxide containing 0.03% by mass of boron with respect to the positive electrode active material and represented by a composition formula $Li_{1.03}Ni_{0.88}Co_{0.12}Al_{0.03}O_2$.

Example 2

In Example 2, a positive electrode active material was obtained in a similar manner to Example 1 except that $H_3BO_3$ was added such that the amount of boron was 0.005% by mass with respect to the positive electrode active material.

Example 3

In Example 3, a positive electrode active material was obtained in a similar manner to Example 1 except that $H_3BO_3$ was added such that the amount of boron was 0.1% by mass with respect to the positive electrode active material.

Example 4

In Example 4, a positive electrode active material was obtained in a similar manner to Example 1 except that $B_2O_3$ was added such that the amount of boron was 0.02% by mass with respect to the positive electrode active material.

Example 5

In Example 5, a positive electrode active material was obtained in a similar manner to Example 1 except that $LiBO_2$ was added such that the amount of boron was 0.05% by mass with respect to the positive electrode active material.

Comparative Example 1

In Comparative Example 1, a positive electrode active material was obtained in a similar manner to Example 1 except that $H_3BO_3$ was added such that the amount of boron was 0.0005% by mass with respect to the positive electrode active material.

Comparative Example 2

In Comparative Example 2, a positive electrode active material was obtained in a similar manner to Example 1 except that $H_3BO_3$ was added such that the amount of boron was 0.3% by mass with respect to the positive electrode active material.

Comparative Example 3

In Comparative Example 3, a positive electrode active material was obtained in a similar manner to Example 1 except that the firing temperature was 700° C.

Comparative Example 4

In Comparative Example 4, a positive electrode active material was obtained in a similar manner to Example 1 without addition of $H_3BO_3$.

Evaluation Results

X-ray diffraction of each of the positive electrode active materials obtained in Examples 1 to 5 and Comparative Examples 1 to 3 was measured, and a peak of $Li_3BO_3$ was detected in addition to the lithium-nickel composite oxide. Table 1 indicates results of producing coin-type batteries using the positive electrode active materials obtained in Examples and Comparative Examples and measuring initial discharge capacity thereof, and results of leaving the positive electrode active materials in the atmosphere at 80° C. for 24 hours, then producing coin-type batteries similarly, and measuring initial discharge capacity thereof.

In Examples 1 to 5, a surface was uniformly coated with $Li_3BO_3$, and the initial discharge capacity after exposure to the atmosphere was improved. In Comparative Example 1, since the amount of boron was small, the coating layer formed of $Li_3BO_3$ was thin, and an effect of suppressing atmospheric deterioration could not be exhibited sufficiently. Therefore, it is considered that the initial discharge capacity after exposure to the atmosphere was reduced. In Comparative Example 2, the amount of boron was large, and the coating layer formed of $Li_3BO_3$ was thick. Therefore, it is considered that the initial discharge capacity before exposure to the atmosphere was reduced. In Comparative Example 3, since the firing temperature was low, $Li_3BO_3$ was not dissolved during firing, and coating with $Li_3BO_3$ was non-uniform. Therefore, it is considered that the initial discharge capacity after exposure to the atmosphere was reduced. In Comparative Example 4, since there was no coating with $Li_3BO_3$, the initial discharge capacity after exposure to the atmosphere was largely reduced.

electrode active material for a lithium ion battery used as a power source for a hybrid car or an electric car.

Note that the technical scope of the present invention is not limited to the above embodiment. For example, one or more of the requirements described in the above embodiment may be omitted. The requirements described in the above embodiment can be combined as appropriate. To the extent permitted by law, the contents of Japanese Patent Application No. 2017-162661, which is a Japanese patent application, and all the Literatures cited in the above-described embodiment and the like are incorporated as part of the description of this text.

REFERENCE SIGNS LIST

CBA Coin-type battery
CA Case
PC Positive electrode can
NC Negative electrode can
GA Gasket
PE Positive electrode
NE Negative electrode
SE Separator

The invention claimed is:

1. A method for producing a positive electrode active material for a non-aqueous electrolyte secondary battery, comprising a lithium-nickel composite oxide represented by general formula (1): $Li_aNi_{1-x-y}Co_xM_yO_{2+\alpha}$ (in which $0.05 \leq x \leq 0.35$, $0 \leq y \leq 0.10$, $0.95 \leq a \leq 1.10$, $0 \leq \alpha \leq 0.2$, and M represents at least one element selected from Mn, V, Mg, Mo, Nb, Ti, W, and Al) and $Li_3BO_3$, the method comprising:
  mixing a boron compound, at least one of a nickel composite hydroxide and a nickel composite oxide, and a lithium compound to obtain a lithium mixture; and
  firing the lithium mixture in an oxygen atmosphere at a temperature of 715° C. or higher and 850° C. or lower to obtain a lithium-nickel composite oxide, wherein

TABLE 1

| | Nickel composite hydroxide Composition | Content of boron to positive electrode active material % by mass | Added boron compound Type | Lithium compound Type | Firing temperature ° C. | Initial discharge capacity | | |
|---|---|---|---|---|---|---|---|---|
| | | | | | | Before exposure to atmosphere mAh/g | After exposure to atmosphere mAh/g | Change amount % |
| Example 1 | $Li_{1.03}Ni_{0.88}Co_{0.12}Al_{0.03}O_2$ | 0.03 | $H_3BO_3$ | LiOH | 750 | 203 | 200 | 1.5 |
| Example 2 | | 0.005 | $H_3BO_3$ | | 750 | 204 | 196 | 3.9 |
| Example 3 | | 0.1 | $H_3BO_3$ | | 750 | 198 | 195 | 1.5 |
| Example 4 | | 0.02 | $B_2O_3$ | | 750 | 202 | 199 | 1.5 |
| Example 5 | | 0.05 | $LiBO_2$ | | 750 | 200 | 198 | 1.0 |
| Comparative Example 1 | $Li_{1.03}Ni_{0.88}Co_{0.12}Al_{0.03}O_2$ | 0.0005 | $H_3BO_3$ | LiOH | 750 | 204 | 192 | 5.9 |
| Comparative Example 2 | | 0.3 | $H_3BO_3$ | | 750 | 194 | 191 | 1.5 |
| Comparative Example 3 | | 0.03 | $H_3BO_3$ | | 700 | 202 | 192 | 5.0 |
| Comparative Example 4 | | 0 | — | | 750 | 205 | 191 | 6.8 |

INDUSTRIAL APPLICABILITY

The positive electrode active material for a non-aqueous electrolyte secondary battery according to the present invention suppresses atmospheric deterioration, and can exhibit stable performance at low cost. Therefore, the positive electrode active material is particularly suitable as a positive the boron compound is mixed in an amount such that the content of boron is 0.001% by mass or more and 0.2% by mass or less with respect to the entire positive electrode active material, and at least a part of a surface of the obtained lithium-nickel composite oxide is coated with $Li_3BO_3$, a diffraction peak of $Li_3BO_3$ is only detected as a diffraction peak other than that derived from the lithium-nickel composite oxide in powder X-ray diffraction, and the method is conducted without a step of reducing the content of boron from the lithium-nickel complex oxide such that the content of boron from the lithium mixture is maintained in the entire lithium-nickel complex oxide produced by the method.

2. The method for producing a positive electrode active material for a non-aqueous electrolyte secondary battery according to claim 1, wherein the boron compound contains at least one selected from $H_3BO_3$, $B_2O_3$, and $LiBO_2$.

3. The method for producing a positive electrode active material for a non-aqueous electrolyte secondary battery according to claim 1, wherein the lithium compound contains lithium hydroxide.

4. The method for producing a positive electrode active material for a non-aqueous electrolyte secondary battery according to claim 1, wherein at least a part of a surface of the lithium-nickel composite oxide is coated with $Li_3BO_3$ alone.

* * * * *